UNITED STATES PATENT OFFICE.

GADIENT ENGI, OF BASEL, SWITZERLAND, ASSIGNOR TO FIRM OF SOCIETY OF CHEMICAL INDUSTRY IN BASLE, OF BASEL, SWITZERLAND.

GREEN VAT-DYE AND PROCESS OF MAKING SAME.

No. 872,227.   Specification of Letters Patent.   Patented Nov. 26, 1907.

Application filed June 14, 1907. Serial No. 378,929.

*To all whom it may concern:*

Be it known that I, GADIENT ENGI, a chemist and doctor of philosophy, a citizen of the Swiss Republic, and resident of Basel, Switzerland, have invented new and useful Green Vat-Dyestuffs and a Process for the Manufacture of the Same, of which the following is a full, clear, and exact specification.

It is known that the dyestuff designed beta-naphth-indigo and corresponding with the constitutional formula:

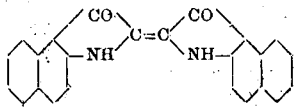

dyes cotton without a mordant in an alkaline vat green tints. On account of the want of fastness of these tints to washing and their poor degree of fastness to chlorin, beta-naphthindigo presents no tinctorial interest. I have now discovered that the tinctorial properties of beta-naphthindigo can be considerably improved by introducing a halogen into the molecule. This change can, for example, be effected by first subjecting beta-naphthisatin

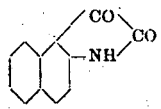

to the action of a halogen or of a substance yielding a halogen, best in presence of an indifferent solvent or diluent and then treating the halogenized derivatives of beta-naphthisatin thus obtained, preferably after transforming them into corresponding chlorids, with suitable reducing agents. There are thus obtained halogen substitution derivatives of beta-naphthindigo which constitute products of very great value, since they dye cotton without a mordant in an alkaline vat vivid green tints of excellent fastness to washing and good fastness to chlorin.

The invention will be illustrated by the following examples:

Example I. 10 parts of beta-naphthisatin, 50 parts of glacial acetic acid and 30—33 parts of bromin are heated to boiling for about 1½–2 hours in a reflux apparatus in an oil bath, during which operation much hydrogen bromid is evolved. After cooling, the brominated derivative separates, with excellent yield, in the form of small red-brown crystals which are isolated by filtration, washed with glacial acetic acid and dried. To transform this product into a bromo-derivative of beta-naphthindigo, the procedure is as follows: 10 parts of the bromo-naphthisatin are well mixed with 100 parts of phosphorus oxychlorid and 6 parts of phosphorus pentachlorid, and the whole is heated to boiling in a reflux apparatus in an oil bath for 40 minutes. After cooling, and if necessary after the excess of phosphorus oxychlorid has been expelled by distillation, the mass is poured into about 400 parts of a solution of hydroiodic acid in glacial acetic acid, the hydroiodic acid amounting to 10 per cent of the solution; the whole is boiled for a short time, cooled and then poured into an aqueous solution of sulfurous acid, thus producing an abundant precipitate of small clear grayish yellow crystals. The mixture is now made alkaline with diluted caustic soda and air is blown through the mass, the latter being hot, for a short time, whereupon the dyestuff is precipitated in the form of green flocks which are filtered, washed and dried.

The bromonaphthindigo thus obtained forms a dark green crystalline powder, soluble in concentrated sulfuric acid to a blue solution tending slightly towards green, little soluble in cold nitrobenzene to a green solution and easily soluble in hot nitrobenzene to a greenish blue solution. By treatment with alkaline reducing agents, a red-brown liquid is obtained which dyes cotton in a vat, green tints distinguished from those obtained with beta-naphthindigo by an excellent fastness to washing, a better fastness to chlorin and a greater tinctorial richness.

Example II. 1 part of brom-beta-naphthisatin is transformed according to the indications of Example I into the corresponding bromonaphthisatinchlorid and after cooling the said chlorid separated in the form of small, clear-brown crystals, is isolated by filtration and drying. Then this bromonaphthisatin chlorid is boiled, with a mixture of 10 parts of a concentrated aqueous solution of ammoniumhydrosulfid and 10 parts of alcohol in a reflux apparatus, during about 2 hours; hereafter the quadruple or quintuple quantity of water is added to the mass and the resulting mixture boiled again for about 1 hour, whereby the bromo-beta-naphthindigo separates as a heavy green, crystalline powder, which is isolated by filtration, washing and drying.

What I claim is:

1. The described process for the manufacture of halogen derivatives of beta-naphthindigo, which process consists in first treating beta-naphthylisatin with halogenating agents, then reducing the resulting halogen derivatives of beta-naphthylisatin, preferably after their conversion into the corresponding chlorids, and finally treating the so obtained reduction products with suitable oxidizing agents.

2. The described process for the manufacture of halogen derivatives of beta-naphthylindigo which process consists in treating beta-naphthylisatin with bromin, then reducing the resulting bromo derivatives of beta-naphthylisatin, preferably after their conversion into the corresponding bromo-beta-naphthylisatinchlorids, and finally treating the so obtained reduction products with suitable oxidizing agents.

3. As new products, the halogen derivatives of beta-naphthylindigo, which can be obtained by first treating beta-naphthylisatin with halogenating agents, then reducing the resulting halogen derivatives of beta-naphthylisatin after their conversion into the corresponding chlorids and finally treating the so obtained reduction products with suitable oxidizing agents, the said halogen derivatives of beta-naphthylindigo being vat-dyestuffs dyeing unmordanted cotton from alkaline vats green tints fast to washing, light and chlorin.

4. As a new article of manufacture the described green vat-dyestuff, being a bromo derivative of beta-naphthylindigo and constituting, in dry state, a dark-green crystalline powder dissolving in concentrated sulfuric acid with greenish blue color, only difficultly soluble in cold nitrobenzene with a green color, easily soluble in hot nitrobenzene with a greenish-blue color and yielding by treatment with alkaline reducing agents, a reddish-brown vat, from which unmordanted cotton is dyed in vivid green shades, fast to washing, light and chlorin.

In witness whereof I have hereunto signed my name this 4 day of June 1907, in the presence of two subscribing witnesses.

GADIENT ENGI.

Witnesses:
 GEO. GIFFORD,
 AMAN I. RITTER.